United States Patent
Heath et al.

(10) Patent No.: US 6,637,551 B2
(45) Date of Patent: Oct. 28, 2003

(54) CHECK BALL FILTER FOR TRANSMISSIONS

(75) Inventors: Roy William Heath, Midland, MI (US); Thomas C. Rytlewski, Auburn, MI (US); Douglas D. Mc Clain, Essexville, MI (US); George E. Arlt, Midland, MI (US)

(73) Assignee: Delphi Technologies, Inc., Troy, MI (US)

( * ) Notice: Subject to any disclaimer, the term of this patent is extended or adjusted under 35 U.S.C. 154(b) by 86 days.

(21) Appl. No.: 09/934,336

(22) Filed: Aug. 21, 2001

(65) Prior Publication Data

US 2003/0040391 A1 Feb. 27, 2003

(51) Int. Cl.[7] ................................................ F01M 1/10
(52) U.S. Cl. ..................................................... 184/6.24
(58) Field of Search ............................ 184/6.12, 6.24

(56) References Cited

U.S. PATENT DOCUMENTS

| | | | | |
|---|---|---|---|---|
| 3,810,716 A | * | 5/1974 | Abrahams et al. | 417/313 |
| 5,215,655 A | * | 6/1993 | Mittermaier | 210/234 |
| 5,766,469 A | * | 6/1998 | Boast et al. | 210/335 |
| 5,956,952 A | * | 9/1999 | Takada et al. | 60/468 |

* cited by examiner

Primary Examiner—Chong H. Kim
(74) Attorney, Agent, or Firm—Michael D. Smith

(57) ABSTRACT

A hydraulic transmission fluid supply system for operating a transmission of a vehicle includes a hydraulic pump having an inlet and an outlet communicating with an inlet of the transmission. A filter assembly includes a filter housing having an inlet communicating with a source of hydraulic fluid and a fluid outlet communicating with the inlet of the pump. A check valve is associated with the filter housing inlet to permit only one-way flow of fluid through the system such that in the event the transmission develops an air leak, the fluid is nonetheless maintained in the system and not permitted to back flow through the system.

4 Claims, 1 Drawing Sheet

CHECK BALL FILTER FOR TRANSMISSIONS

BACKGROUND OF THE INVENTION

1. Technical Field

This invention relates generally to hydraulic fluid supply systems for operating high pressure transmissions of vehicles.

2. Related Art

In a typical high pressure supply system for an automatic transmission, an oil pan is mounted below the transmission to contain a supply of hydraulic transmission fluid. A hydraulic pump is housed in the pan and has an outlet communicating with an inlet of the transmission. Also housed within the pan below the pump is a filter device which includes a housing having an outlet communicating with the pump and an inlet communicating with the source of fluid in the pan. The pump draws fluid from the pan through the filter and delivers it to the transmission.

It is important in such systems that fluid be maintained in the system even when the vehicle is not in operation. If pressure is lost due to an air leak in the transmission, it would allow for some or all of the fluid to drain back into the pan. Once the fluid is drained, it can take some time for the system to restore sufficient pressure to operate the transmission, during which time the vehicle would be disabled. Losing line pressure can also cause damage to the pump if allowed to run dry or at low pressure for an extended time.

It is difficult to build a transmission that is completely air tight.

It is an object of the present invention to overcome the loss of fluid problems associated with the occurrence of air leaks.

SUMMARY OF THE INVENTION

A hydraulic system constructed according to a presently preferred embodiment of the invention for operating a transmission of a vehicle comprises a hydraulic pump having a fluid inlet for drawing hydraulic transmission fluid into the pump and a fluid outlet for expelling the fluid under elevated pressure from the pump to the transmission. The system also includes a source of the hydraulic fluid and a filter device having a filter housing provided with an inlet which communicates with the fluid source and an outlet which communicates with the inlet of the pump. The system also includes a check valve which is operative to permit one way flow of the fluid in the system.

The invention further contemplates a transmission filter assembly for such a system which comprises a housing having a fluid inlet for communicating with the source of hydraulic fluid, a fluid outlet for communicating with a pump, and a filter medium disposed within the housing between the inlet and outlet for filtering fluid passing through the housing. The assembly includes a check valve communicating with the inlet of the filter housing to permit one way flow of fluid into the filter housing through the inlet.

The invention provides a simple, low cost solution to solving the problems associated with air leaks in a high pressure fluid supply system for a transmission of an automotive vehicle. The check valve permits fluid to flow through the system and to be supplied to the transmission for its operation, but blocks reverse flow of the fluid. In the event the transmission develops an air leak which would normally cause the fluid to drain back into the transmission oil pan, the check valve operates to stop such back flow during periods when the supply system is not actively supplying fluid for operating the transmission (e.g., when the engine of the vehicle is not running). Thus, the system of the invention is immune to the problems normally encountered with high pressure transmissions that are prone to leaking air into the fluid supply system.

The invention has the further advantage of maintaining the hydraulic pump in a primed state and ready at the start-up of the vehicle to immediately supply sufficient fluid pressure to the transmission for its operation, regardless of whether or not the transmission has or has not developed an air leak. Maintaining the pump in a ready state independently of the air-tight integrity of the transmission has the advantage of providing better overall performance of the system because it is insensitive to the integrity of the sealing of the transmission. Maintaining the pump in a primed ready state has the further advantage of prolonging the expected operating life of the pump by lessening the demand on the pump to restore high pressure conditions in the event of a transmission air leak. Maintaining the pump in a primed ready condition assures that the pump does not run dry which can damage or destroy a hydraulic pump.

The invention has the further advantage of simplifying the solution to the problem of air leaks and high pressure transmissions by providing the subject supply system outfitted with the check valve which enables the system to operate in connection with virtually any transmission, making it adaptable for solving virtually any performance problems associated with transmission air leaks.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
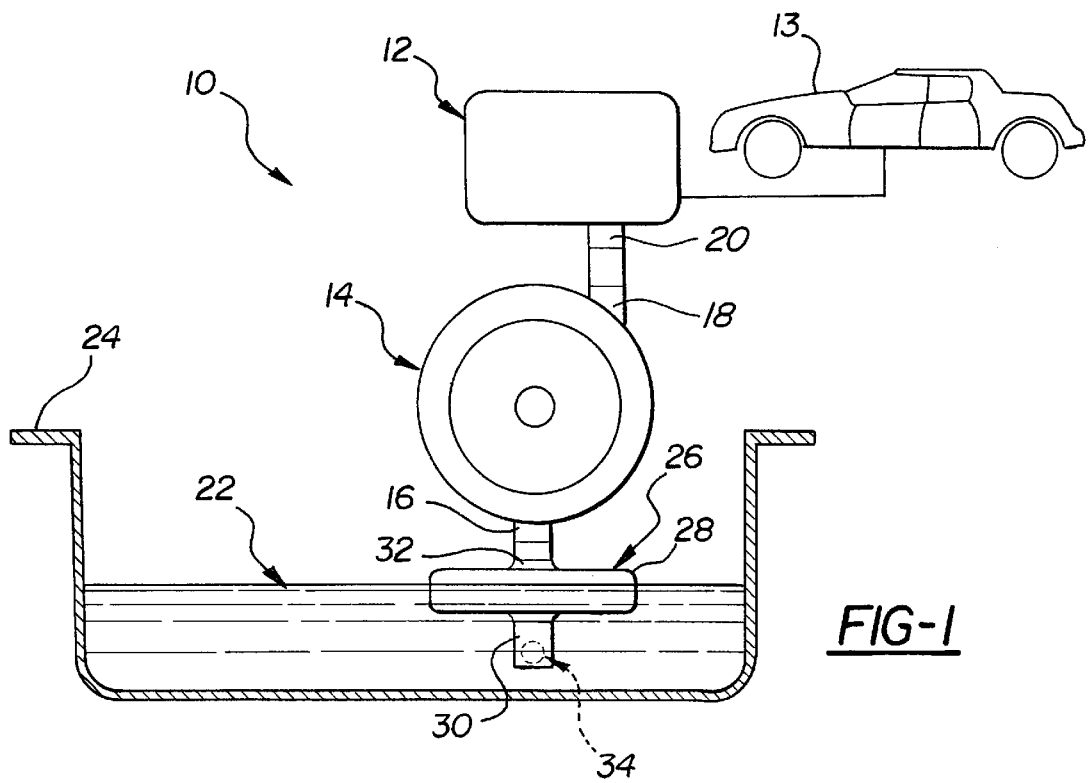
FIG. 1 is a schematic diagram of a hydraulic transmission fluid supply system constructed according to a presently preferred embodiment of the invention.

A hydraulic transmission fluid supply system constructed according to a presently preferred embodiment of the invention is shown generally at 10 in FIG. 1 and comprises a high pressure transmission 12 of an automotive vehicle which typically operate in the range from a few hundred psi to several thousand psi fluid pressure. When fluid pressure drops below the required range, the performance of the transmission diminishes and in some cases the transmission becomes inoperative.

The system 10 further includes a hydraulic pump 14 which may comprise any of a number of hydraulic pumps which are now or later available in the market for supplying hydraulic fluid to the transmission at the required elevated pressure for operating the transmission. Those skilled in the art are well aware of the construction and operation of such pumps, and thus the details concerning any one given pump are omitted from this description for the purpose of simplicity, but the term hydraulic pump is understood to include any pump suitable for supplying hydraulic fluid to the transmission at the required operating pressure. The pump 14 has an inlet 16 for drawing hydraulic transmission fluid into the pump 14, and a fluid outlet 18 for discharging the fluid at the desired elevated pressure to the transmission 12 for operating the transmission 12. The pump 14 is mounted on the vehicle 13 with the outlet 18 of the pump 14 positioned below the inlet 20 of the transmission with which the pump 14 communicates.

Positioned below the pump 14 is a source 22 of hydraulic transmission fluid. The source 22 is preferably contained in a transmission oil pan 24 bolted or otherwise secured to the bottom of the transmission 12 in conventional manner.

Mounted within the oil pan 24 below the pump 14 is a transmission filter assembly 26, which includes a filter housing 28 having a fluid inlet 30 in communication with the source 22 for admitting fluid into the housing, and a fluid outlet 32 communicating with the inlet 16 of the pump 14 for discharging fluid from the housing to the pump 14.

The system 10 further includes a check valve 34 which is operative to allow one way flow of the hydraulic fluid through the system from the source 22 to the transmission 12 and to block reverse flow in the event the transmission 12 or the system 10 develops an air leak up-line of the check valve 34.

Figure 2:
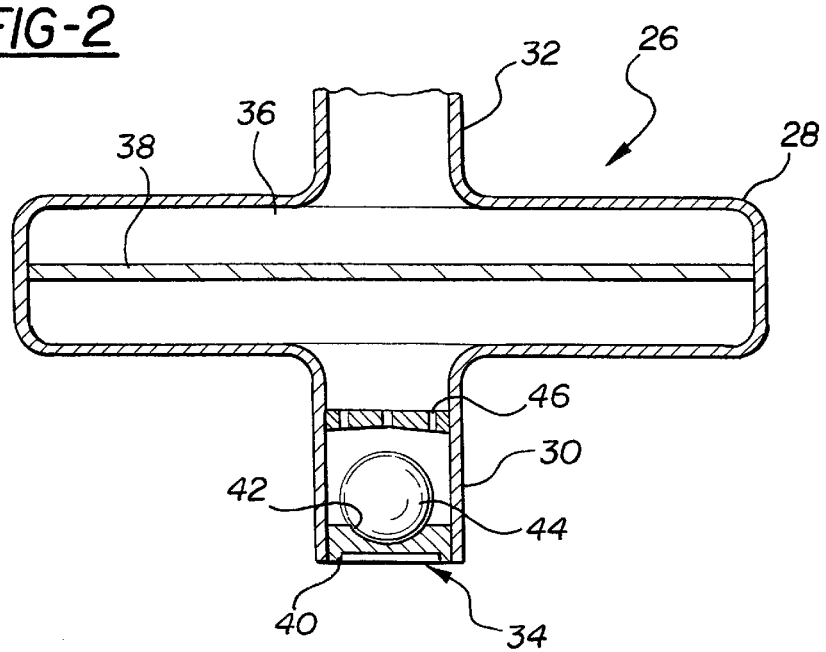
FIG. 2 is a fragmentary cross-sectional view illustrating preferred features of the filter device of the system.

FIG. 2 illustrates further details of the filter assembly 26 and the check valve 34. The filter housing 28 defines an enclosed space 36 in which a filter medium 38 is housed. The filter medium 38 is disposed between the housing inlet 30 and outlet 32 and operates to filter the hydraulic fluid passing through the housing 28. Any filter medium and arrangement of the filter medium within the housing which operates to filter the fluid is contemplated by the invention and is not limited to any particular material or configuration of the medium. The filter medium shown in the drawings is intended to illustrate, in a general way, the basic provision of a filter medium, without restricting the scope or interpretation of the filter medium 28 or the filter assembly 26 to any particular arrangement, other than that which would operate to supply filtered hydraulic transmission fluid to the pump and have the basic provision of the fluid inlet 30 and fluid outlet 32.

The check valve 34 is preferably associated with the inlet 30 of the filter housing 28. In the vent there is an air leak in the system up-line of the check valve 34, the check valve 34 prevents the fluid from draining by gravity or head pressure back through the system 10 and into the oil pan 24. The check valve 34 is operative when the pump is operating and drawing hydraulic fluid through the housing 28 and into the pump 14 to open the inlet 30 to allow for the flow of fluid through the system 10 from the source 22 to the transmission 12. When operation of the pump 14 is discontinued such that it no longer draws fluid through the housing 28 through negative pressure at the housing inlet 30, the check valve 34 closes the inlet 30 and thereby blocks the back flow of hydraulic fluid through the system 10 into the oil pan 24. With the check valve 34 closed, the system 10 is insensitive to any air leaks up-line of the valve 34 since such air leaks would not enable the fluid to back flow into the oil pan due to the closed position of the check valve 34. The check valve 34 thus maintains the pump 14 in a primed, ready to serve condition irrespective of any air leaks in the system, and primarily air leaks in the transmission 12.

The check valve 34 preferably comprises a check ball valve which includes a valve seat 40 having a part-conical seal surface 42 disposed at the inlet 30 within the filter housing 28, as the preferred location for the valve 34. The valve seat 40 supports a movable ball 44 which seats against the seal surface 42 when the pump 14 is not in operation so as to close the inlet 30, and moves out of contact with the seal surface 42 in response to operation of the pump 14 to thereby open the inlet 30 to permit the one-way flow of fluid through the system to supply the transmission 12. The valve seat 40 may be plastic, metal, or other suitable material, and the ball may likewise be plastic, metal or other suitable material which operate to provide the one-way flow through the system 10. A cage or other ball retainer feature 46 may be provided in connection with the valve seat 40 and ball 44 to enable the ball 40 to move into and out of contact with the valve seat 44 opening the inlet 30, while limiting the range of such movement so as to make certain that the ball 44 can return to the seated closed position when operation of the pump 14 is discontinued.

While a check ball valve is the preferred type of check valve 34, it is not the only type contemplated by the invention. The invention contemplates the use of other one-way type valves, such as flopper valves or control valves which would operate in the same general manner by selectively opening the inlet 30 when the pump 14 is operative, and closing the inlet 30 when operation of the pump 14 is discontinued.

The disclosed embodiments are representative of presently preferred forms of the invention, but are intended to be illustrative rather than definitive thereof. The invention is defined in the claims.

What is claimed is:

1. A hydraulic transmission fluid supply system for operating a transmission of a vehicle, comprising:

a hydraulic pump having a fluid inlet for drawing hydraulic transmission fluid into the pump and a fluid outlet for expelling the fluid under elevated pressure from said pump to the transmission;

a source of the hydraulic transmission fluid;

a filter device having a filter housing separate from said pump with an inlet communicating with said source of fluid, an outlet communicating with said inlet of said pump and a filter medium disposed between said inlet and said outlet of said filter housing; and a check valve disposed in said filter housing between said inlet and said filter medium operative to permit one way flow of the fluid into said filter hosing through said inlet of said filter housing while preventing reverse flow.

2. The hydraulic system of claim 1 wherein said check valve is disposed in said inlet of said filter housing.

3. The hydraulic system of claim 1 wherein said check valve comprises a check ball valve.

4. The hydraulic system of claim 3 wherein said check ball valve includes a ball seat disposed in said inlet of said filter housing and a movable ball supported by said sat to permit said fluid to flow into said filter housing through said inlet of said housing while preventing reverse flow of said fluid.

* * * * *